United States Patent Office 2,883,517
Patented Apr. 21, 1959

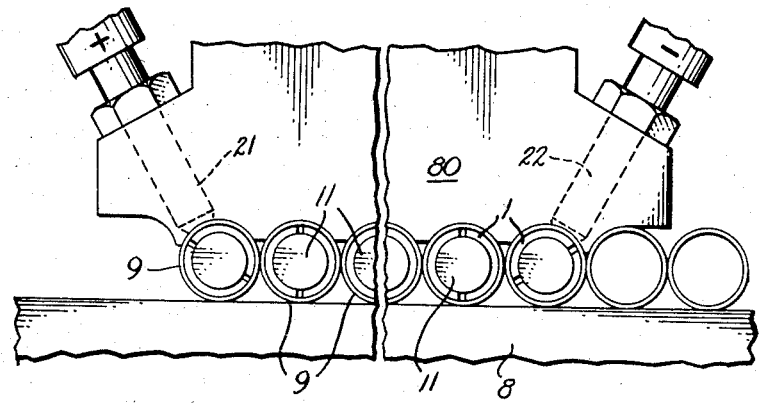
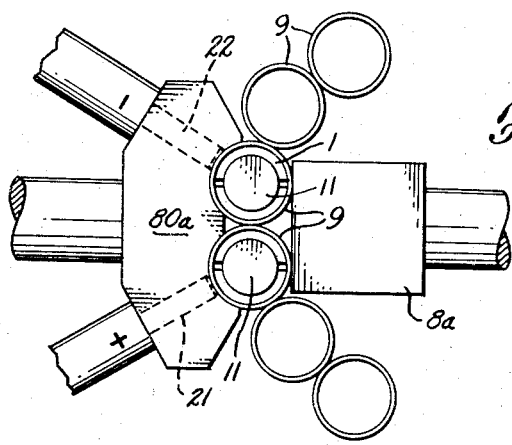
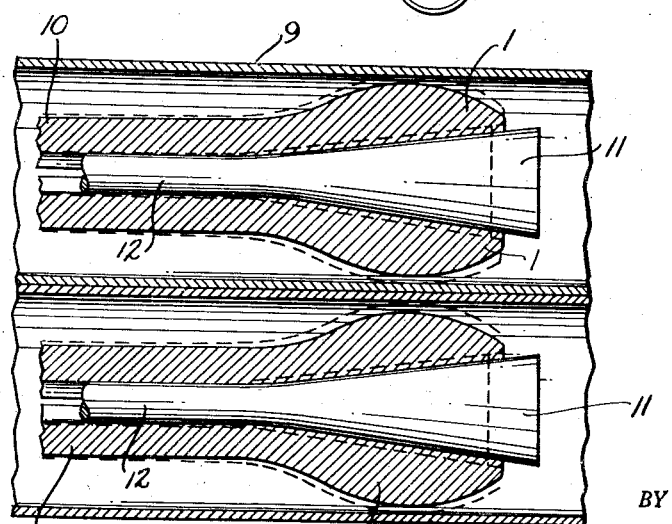
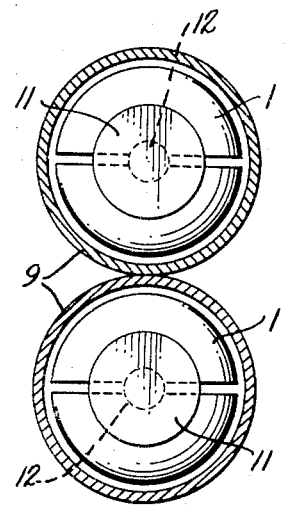
INVENTORS.
LON C. RICE
BERNT O. SATRE
HOWARD E. SNYDER

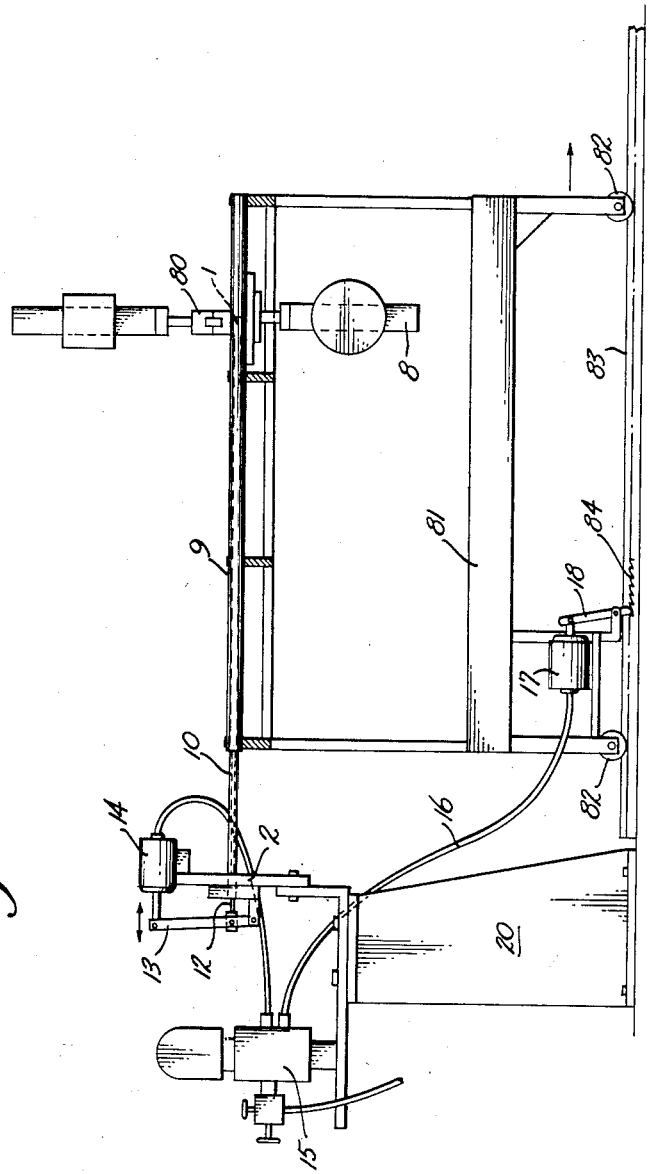

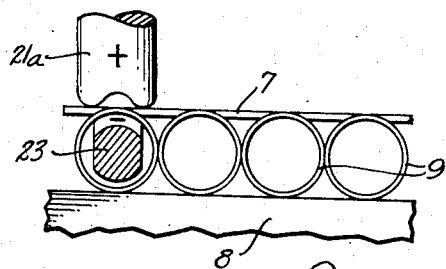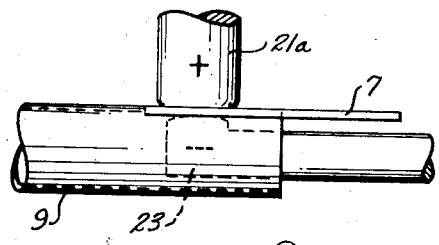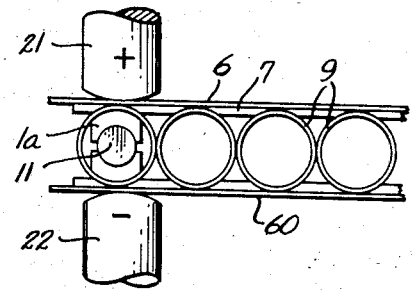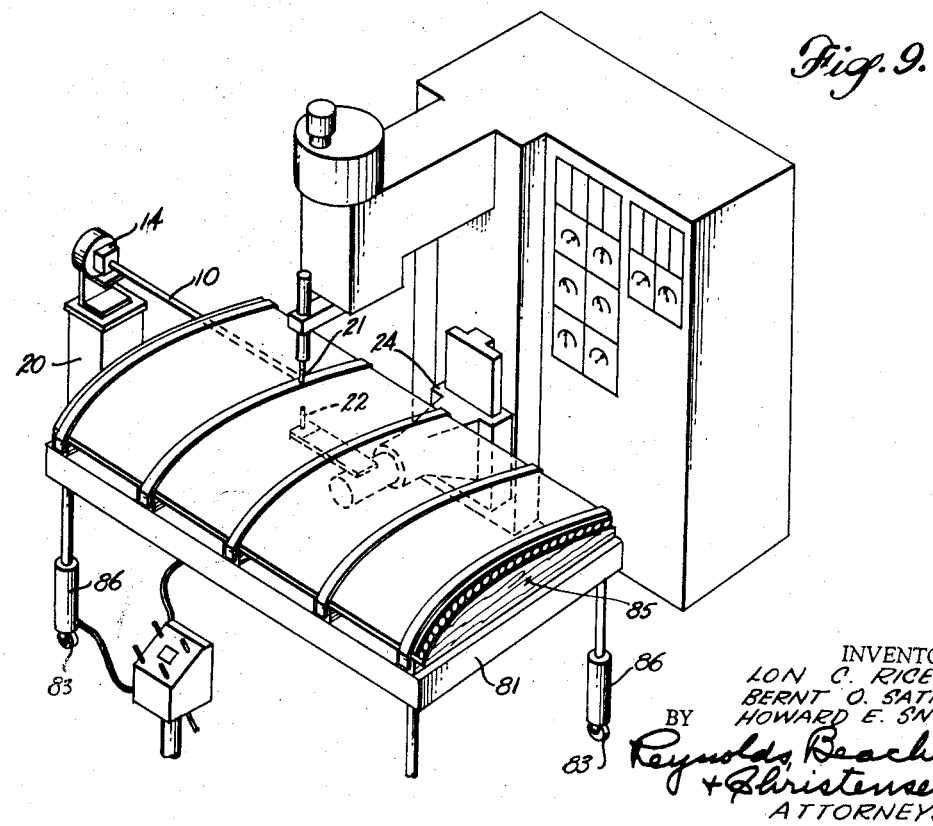

2,883,517

WELDING APPARATUS AND METHOD FOR WELDING TUBULAR SKIN STRUCTURES

Lon C. Rice and Bernt O. Satre, Seattle, and Howard E. Snyder, Mercer Island, Wash., assignors to Boeing Airplane Company, Seattle, Wash., a corporation of Delaware Application September 23, 1957, Serial No. 685,541

10 Claims. (Cl. 219—117)

Airplane wings and other structural parts, especially when of thin section, as are those intended for use in high speed aircraft, are sometimes primarily formed as stressed skins with a minimum of internal bracing, each skin consisting of parallel metal tubes contacting and joined to one another, with a metal skin sheet applied exteriorly at least, and usually both interiorly and exteriorly, to the tubes of the assembly, and joined thereto. An example of such a skin assembly is found in the co-pending application of Richard S. Reinhold, Serial No. 560,399, filed January 20, 1956. Since it is impracticable to build complete wings or the like as single units, the several separate panels or parts must be joined in a manner to transmit stresses reliably and uniformly across a joint from one panel to another. A joint structure for this purpose, disclosed in a Reinhold application Serial No. 538,435, filed October 4, 1955 (now Patent No. 2,845,151 issued July 29, 1958), includes finger plates for securement to the tubes at their ends, to which the skin also must be joined.

It will be realized that the joining of the several components permanently, reliably, and at sufficiently close intervals, poses problems which, until solved, may well preclude the adoption of such skin structures as production parts. Riveting is out of the question, for among other objections it would too greatly weaken the components penetrated by numerous rivet holes, and would impose an inordinate weight penalty. Nor are plastic bonding, brazing, or similar procedures wholly suitable, since they are not entirely nor uniformly reliable, nor accessible for inspection to determine their integrity, yet such procedures have been attempted, since they have the advantages of cheapness, lightness, and adaptability to mass production.

Welding is, obviously, the preferred procedure, but the intricacy and small size of the components, and their length—the tubes in particular—make a welding operation by procedures heretofore known a difficult, costly, and not altogether reliable operation. The assembly involves joining the tubes together along their lines of contact, while they are held in the proper contour (usually curved more or less), the application of finger plates to the tube ends, and the joining of the skin or skins to the contoured tubes, and to the finger plates, the tubes during this operation being sandwiched between the skins. Welding requires each of these operations to be performed independently and usually in the sequence indicated, to which end a conductive member, such as an electrode, must be accurately located within a long tube and pressed hard against its wall, while a complemental electrode is applied externally to the assembly, in correct registry with the internal one, or in the operation of joining two parallel tubes along their line of contact, both electrodes may have to be inserted within the small diameter tubes, to contact and press together the same at just the correct spot, but not elsewhere. If such operations can theoretically be performed, no way had been found heretofore to accomplish the joining of such components of a tube assembly reliably, rapidly, and in a manner suitable to production operations. To illustrate, a rectangular test panel three feet by ten feet in area, with no finger plates, was estimated to have some 30,000 weld spots to effect its assembly. Each such weld spot should be accurately located and the weld uniformly accomplished, yet each involves passing a welding current between the interior and the exterior of a tube, under optimum conditions.

The primary aim of the present invention is to provide a method of joining the components of such a tube assembly, by welding, quickly, reliably, uniformly, and to a degree automatically, in a manner adapted to varying contours, and regardless of whether the components being joined are tubes-to-tubes, finger plates to tubes, or skins (one or both) to tubes and finger plates. A further aim is the provision of a conductor or mandrel insertible within each tube, or a bank thereof insertible simultaneously within several related tubes, usually expansible and contractible under control, for conducting welding current between two externally applied electrodes and so joining intervening interfaces of the components or, if the inserted mandrel is itself an electrode, as it may be if short and readily supported against the required pressure, then for conducting welding current passing between an externally applied electrode and the inserted one. Still further, it is the aim of this invention to provide welding apparatus adapted to production procedures, according to the method outlined above, and in particular, to insure correct location and even spacing of the successive welding spots.

The invention is illustrated in simplified and diagrammatic form, for the accomplishment of the several different assembly procedures outlined above.

Figure 1 is an elevational view, looking towards the ends of multiple tubes which are being joined simultaneously, to define a planar panel, although a curved panel can be similarly handled. Figure 2 is a similar view, but illustrating the joining of two tubes to define with others a sharply curved contour.

Figure 3 is an axial sectional view through two such tubes and the mandrels inserted therein, and Figure 4 is a transverse sectional view of the same.

Figure 5 is a general elevational view of the welding machine, during the tube-to-tube joining operation. This illustrates means for spacing the weld spots uniformly.

Figure 6 is a view similar to Figure 1, and Figure 7 is a side elevational view, both illustrating the operation of joining a finger plate to a tube.

Figure 8 is a view similar to Figure 1, illustrating the operation of joining two skin sheets to the opposite faces of a tube assembly, including finger plates.

Figure 9 is an isometric view of a welding machine of somewhat modified form, to adapt it to the welding of a curvedly contoured panel.

Figure 10:
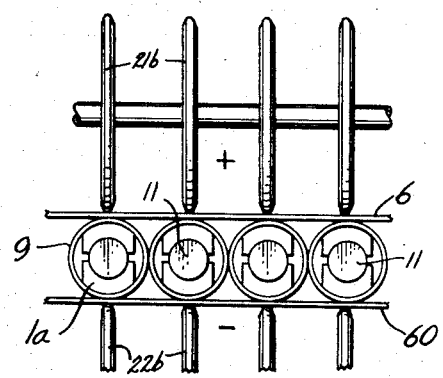
Figure 10 is an end elevation, similar to Figure 1 or 8, illustrating multiple roll welding heads or electrodes, employed in joining skin sheets to a tube assembly or core, such multiple rolls being better adapted to production operations.

Figure 1 illustrates the operation of welding a plurality of tubes together simultaneously at one of a series of spots that will join the tubes throughout their length. The tubes 9 being thin-walled metal tubes of stainless steel, aluminum alloy, titanium or other suitable metal, it will be understood that the welding technique employed will be that which is suitable to the particular metal being welded. Assuming that the tubes are to be welded into a planar tube assembly, they are supported upon a suitable table 8, usually of dielectric material, arranged so that all the tubes are parallel and in contact with one another. The tubes may be welded together in pairs, or in the instance illustrated a number of tubes are welded simultaneously. The assembly of tubes is suitably held in correct relationship, as by application to them of a hold-down head 80 notched to fit over the successive tubes. This hold-down head is of dielectric material, and supports two electrodes 21 and 22, connected to the opposite terminals of a suitable welding machine. By the application of the hold-down head the electrodes are brought into contact with the two outer tubes of a group.

However, it is not practicable to pass the welding current merely through the contacting thin-walled tubes in succession, nor can they be pressed tightly enough together at the correct spots, but rather the welding current and pressure should be concentrated at small spots in the lines of contact between the tubes. It is necessary, therefore, to insert within the tubes conductive elements which will contact each tube and which will serve as a path to carry the current across each tube from one wall to the other and so through the walls of the intervening tubes to the conductive member within the next tube, and so on until the path is completed from one electrode to the other. These conductive members are in the form of mandrels (see Figures 3 and 4) of more or less spherical shape designated by the numeral 1. They are each supported upon an end of a rod 10, and at least at their ends are split, whereby a wedge-like expander 11 actuated by a push pull rod 12 can effect expansion or contraction of each mandrel from a distant point, as from the exterior when the mandrel is inserted deeply within its tube. In Figure 3, the contracted position of the mandrels is shown exaggeratedly in full lines, and the expanded position thereof in dash lines.

Referring now to Figure 5, the rods 10 are supported at one end only upon a supporting structure 2 which is fixed in position upon a stand 20 with relation to the position of the electrodes 21 and 22. The mandrels 1 are so located prior to the beginning of the welding operation that they are in line with the electrodes, and if there are several of them, that they are in a line transversely of the length of the tubes 9. They are at an elevation to enter an end of the tubes when the tubes are moved in the direction of their length. Such movement of the tubes may be accomplished by supporting them upon a traveling carriage 81, mounted upon rollers 82 rolling along fixed rails 83. Obviously, the tubes might be fixed and the electrodes and mandrels arranged to shift relative thereto, in the direction of the tube's length.

The mandrels 1 when contracted permit the tubes 9 to slide freely past the mandrels, but when the mandrels are expanded, they engage the opposite interior walls of the tubes and urge the tubes closely together at the points nearest the largest diameter of the mandrel. The electrodes 21, 22 being applied to the exterior of the tubes at such points of mandrel contact, the welding current passes through the first tube wall, through the mandrel therein, out at the opposite tube wall where the pressure is greatest, and so into the next tube wall and through its mandrel, and so on to the opposite electrode. The several tubes thus pressed into contact are spot welded together, following which the mandrels are contracted, relative movement is effected in the direction of the length of the tubes between the mandrels and the tubes, the mandrels are again expanded, and again welding current is passed, and the tubes are again welded together at spots spaced in the direction of their length. This process is capable of rapid repetition and a group of tubes can be so welded together in a relatively short time.

The welding machine shown in Figure 5 can accomplish the successive operations substantially automatically. The expander rods 12 are connected to an actuator lever or the like indicated at 13, which may be air- or solenoid-operated by the element 14, and a timing element 15 connected to the element 14 accomplishes reciprocation of each expander rod 12 at periodical intervals. A connection at 16 between the timer 15 and a second actuator 17 can be employed to effect reciprocation of a feed dog 18 engageable with the teeth of a ratchet track 84 which parallels a track 83. The actuation of the mandrels also causes advance of the carriage 81 during contraction of the mandrels, advancing the tubes 9 thereon by a distance corresponding to the intended spacing between spots.

In Figure 2 the table 8 is replaced by a backing element 8a, also of dielectric material, and the hold-down head 80 is replaced by a hold-down element 80a. Here the tubes are supported about a sharply curved contour support (omitted), and the welding is desirably accomplished between pairs of tubes only. The principle, however, is the same as that already described.

The operation described heretofore has been the welding of tubes to tubes. Similar principles may be employed in the other operations involved in the completion of the tube assembly. For example, after the tubes are welded together it is necessary to weld finger plates to the tubes at their ends. Such a finger plate 7 is indicated in Figures 6 and 7. Each consists of a plate which is slotted along one edge and contoured so that its exterior surface lies practically tangent with the tubes to which it is applied. Here, as before, a support or backing head 8 is employed, whereon the tubes 9 rest, the backing plate 8 is applied to the ends of the tubes, projecting beyond their ends, as seen in Figure 7, and a conductor 23 is inserted within the tube opposite an electrode 21a which, in this instance, is provided with a bifurcated contact point, each of which engages the finger plate 7 at opposite sides of the slit therein. The element 23 may itself be an electrode, since the distance in from the end of the tube is but short and its support against proper pressure can be assured, or it too may be an expansible mandrel, with dielectric material supporting it, if need be, from contact with the opposite wall of the tube, or it may be a passive conductor carrying current to an electrode engaging the exterior of the tube opposite the electrode 21a. Such variations are common in the welding art. The passing of the current and the advance of the electrode may be controlled in any suitable manner, for instance, in the manner already described.

In like fashion the principles of this invention may be employed in the welding of skins to tubes. This operation is illustrated in Figure 8 where skins 6 and 60 are to be welded simultaneously to the opposite faces of a tube assembly. Here the mandrel 1a is of slightly different shape, since it is not intended to nor should it carry current along the lines of contact of one tube with another, for these lines are already welded together, and it is intended only to carry current from the electrode 21 to the electrode 22 applied to the opposite exterior surfaces of the assembly, that is, to the skins 6 and 60 opposite the individual tubes.

Again, the passage of current and the advancement of the assembly to each new spot location may be effected in the same manner as already described. Figure 9 illustrates a machine suitable to effect such a welding operation. Here the carriage 81 supports a contour former 85 of a contour conforming to that of the tube assembly and of the skins for application thereto. Since the carriage 81 is guided for movement in a horizontal plane, the contour of the assembly will place the individual tubes at different levels, and in order that the mandrels and their supporting rods may enter each such tube, the table may be arranged for elevation or depression by jack means indicated at 86 on its legs. One or both of the electrodes also may be vertically adjustable as is suggested at 24.

Figure 11:
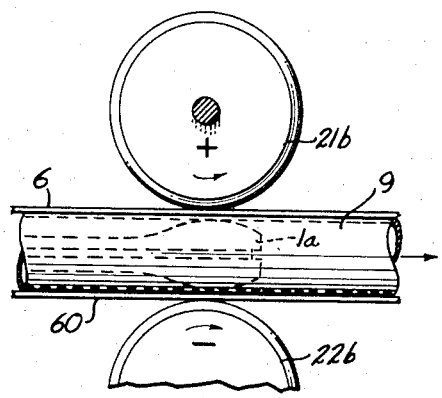
Figure 11 is a side elevational view of the same.
Figure 12:
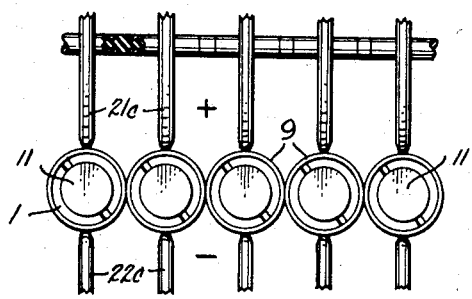
Figure 12 is a view similar to Figure 10, showing the multiple roll electrodes arranged for welding tubes to tubes.

Heretofore a single pair of electrodes has been suggested. The process is susceptible of performance by multiple electrodes, and it is probable that such multiple electrodes would be employed for use in production. Figures 10, 11, and 12 illustrate multiple electrodes applied to two of the operations involved. In Figures 10 and 11, for example, the electrodes 21b are in the form of rollers and the companion electrodes 22b are also formed as rollers. These roll along the lines of contact between the joined tubes 9 and the skins 6 and 60 applied thereto. By suitable arrangement of the electrodes or by timing mechanism, not shown, it can be arranged that a welding current will pass at regular intervals between the electrodes 21b and 22b and so will be transmitted through the passive conductors consisting of the mandrels 1a. It will be understood that there is in effect continuous movement in the direction of the length of the tubes between the mandrel and the electrodes 21b and 22b, all of which are stationary, and the tubes 9 and skins 6 and 60. The mandrel will be of a size to prevent deformation of the tubes and yet will not unduly restrict the lengthwise movement of the mandrel within the tube.

Figure 13:
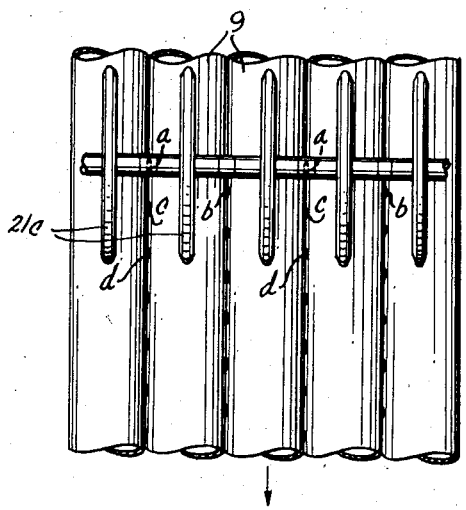
Figure 13 is a plan view, to illustrate a desirable sequence of weld spotting.

It has been found in some instances that welding of the tubes together will tend to warp the tube assembly if a number of tubes are welded together simultaneously. It is particularly noticeable that when two tubes are welded together they tend to warp somewhat. It is desirable to provide for neutralization of this warping effect, and this can be done in a variety of ways. For instance, the tubes may be welded together in pairs while oriented with one side uppermost, after which a similar pair can be reversed, with the side that was uppermost during the welding now lowermost, and then one such tube of one pair may be welded to another tube of the other pair, thus neutralizing or reversing the stressing effect. Another way is suggested in Figures 12 and 13, where the electrodes 21c at one side of the assembly are each independent electrodes, as are the electrodes 22c that contact the opposite side of the assembly. Arrangements may be made through suitable controls (not shown), but which can readily be accomplished by those skilled in the welding art, to pass the current between two tubes of a pair and then to skip a pair and to weld a second pair, whereupon the next spot is accomplished between the skipped tube and the tubes at the opposite faces thereof. For instance, as suggested in Figure 13, spots a may be first completed, then spots b, then spots c, then spots d and so, firing the electrodes in proper sequence.

It will be readily apparent that the present invention is readily adaptable to any of the operations involving such a tubular assembly, and this regardless of whether the tubes are of round section, of elongated or elliptical section, or indeed if they be of sinuous or hat half-section. The invention is applicable wherever it is necessary to locate a conductor, whether passive or active, in pressure-resisting contact with the interior wall of a small passageway, in registry with a companion electrode applied to an exterior wall of the assembly, to effect passage of a welding current through the assembly and across two or more contacting surfaces thereof.

I claim as my invention:

1. A method of joining the several tubes of a tube assembly which includes parallel contacting tubes which are to be joined together, said method comprising inserting a supporting rod within each of the tubes of the assembly, to locate a mandrel of conductive material upon the inserted end of each such rod in a like predetermined location lengthwise of its tube, disposing the mandrels in contact with the inner walls of the tubes adjacent their lines of contact with one another, and in alignment with opposite electrodes of a pair, with the several tubes and their inserted mandrels intervening, contacting the two outermost tubes with the respective electrodes, passing a welding current between the electrodes by way of the tubes and the mandrels, effecting relative movement between the assembly and the electrode and mandrel, in the direction of the length of the tube, and repeating the contacting and welding operations, to produce a succession of spot welds spaced lengthwise of the tubes.

2. A method of joining the parts of an assembly involving parallel contacting tubes which are to be joined together or to external sheets spanning such tubes, said method including orienting the assembly with its tubes directed transversely of a pair of cooperating electrodes, entering a supporting rod, bearing at an unsupported end an expansible mandrel of conductive material within each tube, with its mandrel located intermediate the electrodes, expanding said mandrels to contact opposite interior walls of the tubes, contacting the assembly with the electrodes in the vicinity of each of two separate tubes, and passing a welding current between such electrodes by way of the interposed mandrels, contracting the mandrels, effecting relative movement between the mandrels and the tube assembly in the direction of the tubes' length, again expanding the mandrels and repeating the subsequent operations.

3. A method of joining together a plurality of parallel, contacting tubes which are supported in a given contour, said method including orienting the tubes transversely of a pair of cooperating electrodes, entering a supporting rod, bearing at an unsupported end an expansible mandrel of conductive material, within each tube of the plurality thereof, with its mandrel located intermediate the electrodes, expanding all said mandrels to contact the opposite interior walls of the tubes in the vicinity of their lines of contact, contacting the two exterior tubes in the plurality thereof with the respective electrodes and passing a welding current therebetween, by way of the expanded mandrels and the interposed tube walls, contracting the mandrels and effecting relative movement between the mandrels and the tubes in the direction of the tubes' length, again expanding the mandrels and repeating the subsequent operations to produce weld spots at spaced intervals in the length of the tubes.

4. A method as defined in claim 3, wherein the number of tubes is at least three, A, B, and C, which comprises initially passing the welding current between the pair of tubes A and B, next between the pair of tubes B and C, and then alternately between the two pairs.

5. A method as defined in claim 3, wherein the tubes are first welded together in pairs, the pairs being then juxtaposed with alternate pairs having their original orientation and the intervening pairs reversed top for bottom, and in the same manner welding together the contacting tubes of adjoining pairs.

6. A method of joining a metal skin upon an assembly of parallel metal tubes joined in contacting relation in a given contour, said method including orienting the tube assembly and the applied skin transversely of pairs of cooperating electrodes, each pair whereof is disposed in registry with a different tube, at opposite sides of the surface defined by the assembly, entering a supporting rod, bearing at an unsupported end a tube-wall-contacting mandrel of conductive material, within each tube of the assembly, locating the mandrel in line with and intermediate the corresponding electrodes, and contacting opposite interior walls of the tube in the vicinity of such electrodes, contacting the assembly and the applied skin exteriorly with the electrodes of certain of such pairs, and passing a welding current therebetween, by way of the mandrels, effecting relative movement between the assembly and skin and the mandrel in the direction of the tubes' length, and repeating the contacting and welding operations to produce weld spots between the tube and skin at spaced intervals in the length of the tubes.

7. A method as defined in claim 6, wherein the welding current is passed initially between each two tubes of different pairs in the assembly, then after relative axial movement between a tube of one such pair and a tube of another pair, then again after further axial movement between the initially welded tubes, and so on alternately.

8. A method as defined in claim 6, wherein a plurality of like mandrels are entered simultaneously within a corresponding number of tubes, and are expanded substantially simultaneously for concurrent passage of the welding current.

9. A method as defined in claim 6, wherein a skin is to be joined simultaneously to both faces of a tube assembly, the method including the contacting of the two skins with the respective electrodes, in line with the expanded mandrel within the interposed tube.

10. A method of joining the components of an assembly involving parallel contacting tubes and external sheets spanning such tubes, said method comprising orienting the assembly with its tube components directed transversely of a pair of cooperating electrodes, entering a supporting rod, bearing a tube-wall-contacting mandrel of conductive material at its inserted end, within each tube, with the mandrel located intermediate the electrodes and in contact with the interior tube wall which is to be welded to another component in the vicinity of the exterior point of contact of such other component, contacting the assembly with the electrodes in the vicinity of each of the two outermost mandrel-receiving tubes, and passing a welding current between such electrodes by way of the interposed mandrels, effecting relative movement between the mandrels and the assembly in the direction of the tubes' length, and repeating the contacting and welding operations.

References Cited in the file of this patent

UNITED STATES PATENTS

| | | |
|---|---|---|
| 853,241 | Helberger | May 14, 1907 |
| 1,052,753 | Rietzel | Feb. 11, 1913 |
| 1,995,368 | Sunnen | Mar. 26, 1935 |
| 2,057,017 | Ganahl | Oct. 13, 1936 |